*(12)* United States Patent
Scheer et al.

(10) Patent No.: US 9,355,121 B1
(45) Date of Patent: May 31, 2016

(54) SEGREGATING DATA AND METADATA IN A FILE SYSTEM

(71) Applicant: EMC Corporation, Hopkinton, MA (US)

(72) Inventors: Michael Scheer, Summit, NJ (US); Morgan Clark, South Orange, NJ (US); Ahsan Rashid, Edison, NJ (US); Srinivasa R. Vempati, Upton, MA (US); Marc DeSouter, Wayne, NJ (US); Pranit Sethi, Somerset, NJ (US); Maher Kachmar, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 246 days.

(21) Appl. No.: 13/930,506

(22) Filed: Jun. 28, 2013

(51) Int. Cl.
*G06F 17/30* (2006.01)
(52) U.S. Cl.
CPC .................. *G06F 17/30221* (2013.01)
(58) Field of Classification Search
CPC ............ G06F 17/301; G06F 17/30525; G06F 17/30722; G06F 17/30997; G06F 17/30135; G06F 17/30138; G06F 17/30156; G06F 17/30303; G06F 17/30073; G06F 17/30079; G06F 17/30091; G06F 17/30221; G06F 17/3022
See application file for complete search history.

(56) References Cited

U.S. PATENT DOCUMENTS

| | | | |
|---|---|---|---|
| 7,631,155 B1 | 12/2009 | Bono et al. | |
| 8,055,622 B1 * | 11/2011 | Botes et al. | 707/640 |
| 8,285,758 B1 * | 10/2012 | Bono et al. | 707/822 |
| 8,312,046 B1 * | 11/2012 | Eisler et al. | 707/790 |
| 8,510,538 B1 * | 8/2013 | Malewicz et al. | 712/225 |
| 8,533,295 B2 * | 9/2013 | Soltis | 709/219 |
| 8,788,628 B1 * | 7/2014 | Taylor et al. | 709/219 |
| 8,843,459 B1 * | 9/2014 | Aston et al. | 707/694 |
| 2004/0030668 A1 | 2/2004 | Pawlowski et al. | |
| 2005/0267894 A1 * | 12/2005 | Camahan | 707/10 |
| 2005/0289127 A1 * | 12/2005 | Giampaolo et al. | 707/3 |
| 2008/0301256 A1 * | 12/2008 | McWilliams et al. | 709/214 |
| 2011/0125835 A1 * | 5/2011 | Soltis | 709/203 |
| 2011/0231374 A1 * | 9/2011 | Jain et al. | 707/692 |
| 2012/0254175 A1 * | 10/2012 | Horowitz et al. | 707/737 |

OTHER PUBLICATIONS

Bono, "Unified Datapath Architecture," U.S. Appl. No. 13/828,322, filed Mar. 14, 2013.
Bono, et al., "File System Inline Fine Grained Tiering," U.S. Appl. No. 13/928,591, filed Jun. 27, 2013.
Bono, et al., "Managing Host Data Placed in a Container File System on a Data Storage Array Having Multiple Storage Tiers," U.S. Appl. No. 13/929,019, filed Jun. 28, 2013.
Bono, et al., "Storing Compressed and Uncompressed Data in Blocks Having Different Allocation Unit Sizes," U.S. Appl. No. 14/497,814, filed Sep. 26, 2014.
Bono, et al., "Storage Tiering in Replication Target Based on Logical Extents," U.S. Appl. No. 14/752,616, filed Jun. 26, 2015.

* cited by examiner

*Primary Examiner* — Hosain Alam
*Assistant Examiner* — Saba Ahmed
(74) *Attorney, Agent, or Firm* — BainwoodHuang (57) ABSTRACT

A technique for managing a file system includes dividing the addressable space of a file system into multiple subspaces: a data subspace for user data; an inode subspace for inodes describing the user data; and an MDB (metadata block) subspace for indirect blocks and/or directory structures pertaining to the user data. In response to storage requests to write user files to the file system, the file system stores user data of the files in the data subspace, stores inodes pertaining to the user files in the inode subspace, and stores indirect blocks and/or directories in the MDB subspace.

21 Claims, 5 Drawing Sheets

SEGREGATING DATA AND METADATA IN A FILE SYSTEM

BACKGROUND

Data storage systems are arrangements of hardware and software that typically include multiple storage processors coupled to arrays of non-volatile storage devices, such as disk drives, flash drives, and/or solid state drives (SSDs). Data storage systems typically operate to service storage requests that arrive from users. The storage requests may specify files or other data elements to be written to or read, for example. The storage processors each may include multiple processing units (e.g., CPUs) and memory, and run software that manages incoming storage requests and performs various data processing tasks to organize and secure user data stored on the non-volatile storage devices. Users may access user data from a data storage system via host computing devices, which connect to the data storage system over a network, such as the Internet, a WAN (Wide Area Network), a LAN (Local Area Network), or combination thereof.

Many data storage systems allow users to create file systems, which are stored on and accessed through the data storage systems. In example operation, users of host computing systems connect to storage processors of data storage systems, mount previously created file systems, and proceed to read and write files of the file systems, create new files and directories, delete files and directories, and so forth.

SUMMARY

Many file systems intersperse the content of files, i.e., user data, with metadata that pertain to the user data, such as inodes, indirect blocks, directory structures, and CG (cylinder group) headers. Unfortunately, interspersing data with metadata can impair performance. For example, in some scenarios data storage systems are made to access metadata much more frequently than they are made to access the user data to which the metadata pertains. Interspersing user data with metadata in such systems thus forces all data to be accessed from the same underlying storage device types delivering the same quality of service. What is needed is a better way for organizing file system data and metadata for promoting more efficient utilization of storage resources and improved file system performance.

In contrast with the conventional approach, an improved technique for managing a file system includes dividing the addressable space of the file system into multiple subspaces, such as: a data subspace for user data; an inode subspace for inodes describing the user data; and an MDB (metadata block) subspace for indirect blocks and/or directory structures pertaining to the user data. In response to storage requests to write user files to the file system, the file system stores user data of the files in the data subspace, stores inodes pertaining to the user files in the inode subspace, and stores indirect blocks and/or directories in the MDB subspace. Segregation of data from certain metadata, and of different types of metadata from one another, promotes flexibility and provides a structural basis for many improvements in efficiency.

In some examples, the file system accesses a policy that associates different subspaces of the file system with different tiers of storage. When new storage is requested for a particular subspace of the file system, the policy is accessed and a tier of storage associated with that subspace is identified. The requested storage is then provisioned from one or more underlying storage devices that provide the associated tier of storage.

Additional subspaces may be provided. In some examples, one or more other subspaces are created within the address space of the file system for storing metadata of yet undesignated type. Such subspace or subspaces may thus be used in the future for storing currently undetermined or yet-to-be-invented types of metadata. Such "other" subspaces may be included in file systems prior to the invention or inclusion of such other metadata, such that the subspaces are available for use later when the metadata becomes available, without requiring that file systems be recreated to include such other metadata.

In some examples, a different allocation unit is assigned to the data subspace than to other subspaces. In addition, different allocation units may also be used for different metadata subspaces. The allocation unit for each subspace describes the smallest addressable amount of storage in that subspace. In some examples, the allocation unit for the data subspace is made larger than the allocation unit for the the metadata subspaces, to allow the file system to access larger amounts of user data for any given amount of metadata.

Certain embodiments are directed to a method of managing a file system having an address space. The method includes providing multiple subspaces within the address space of the file system, each subspace having defined boundaries within the address space and having provisioned thereto a respective, distinct set of storage elements derived from one or more physical storage devices. The multiple subspaces include:
  a data subspace having provisioned thereto a set of data storage elements on which host data of the file system are stored, but on which no inodes of the file system or MDBs (metadata blocks, including indirect blocks and directories) of the file system are stored;
  an inode subspace thereto a set of inode storage elements on which inodes of the file system are stored, but on which no host data of the file system or MDBs of the file system are stored; and
  an MDB subspace thereto a set of MDB storage elements on which indirect blocks and/or directory structures of the file system are stored, but on which no host data of the file system or inodes of the file system are stored,
The method further includes provisioning a new data storage element to the data subspace of the file system, storing a set of user data on the new data storage element, storing a set of inodes pertaining to the set of user data in an inode storage element within the inode subspace of the file system, and storing a set of indirect blocks and/or directory structures pertaining to the set of user data in an MDB storage element within the MDB subspace of the file system.

Other embodiments are directed to data storage apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing a file system includes dividing the addressable space of a file system into multiple subspaces: a data subspace for user data; an inode subspace for inodes describing the user data; and an MDB (metadata block) subspace for indirect blocks and/or directory structures pertaining to the user data.

Figure 1:
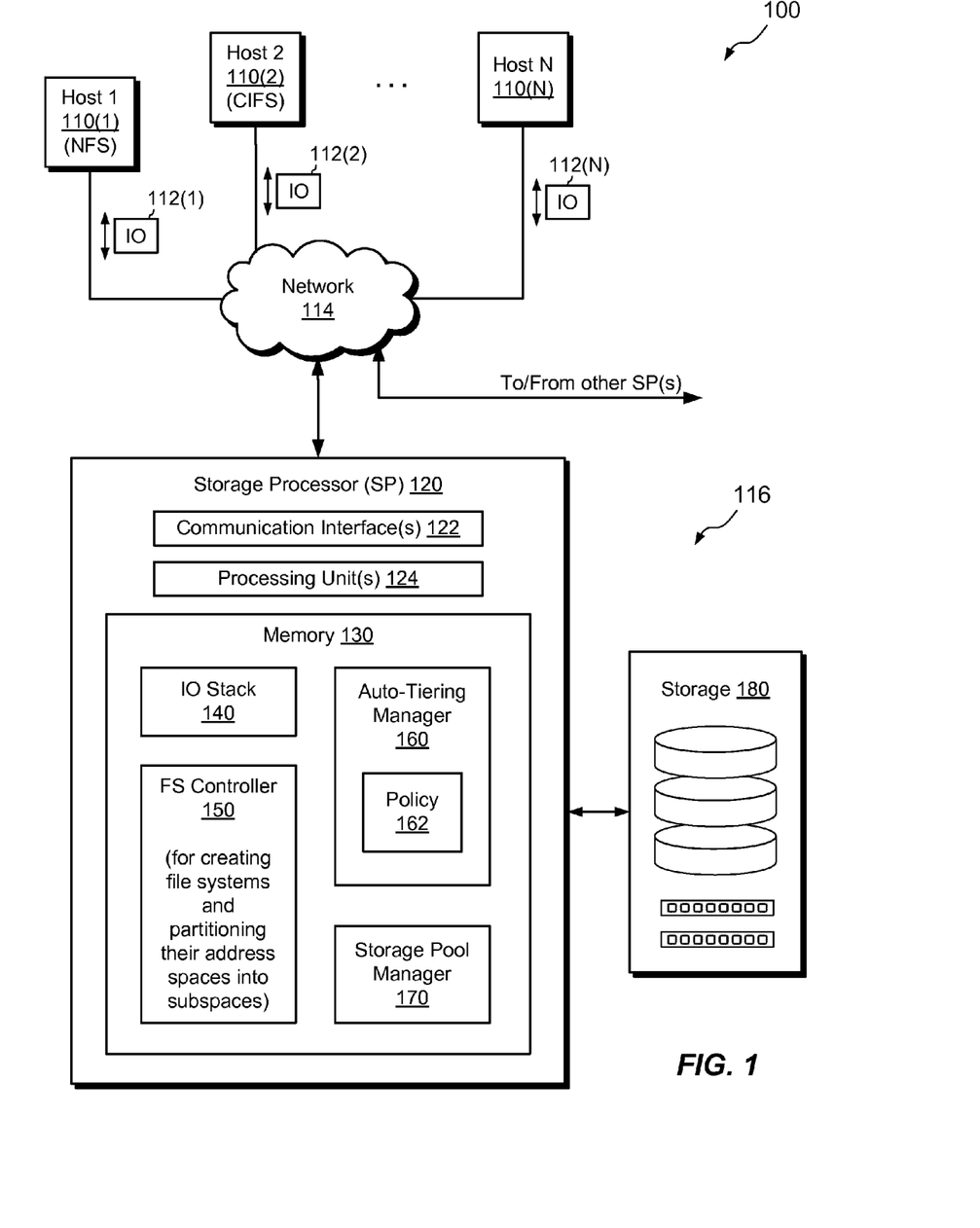
FIG. 1 is a block diagram of an example environment in which the improved techniques hereof can be practiced.

FIG. 1 shows an example environment 100 in which embodiments of the improved technique hereof can be practiced. Here, multiple host computing devices ("hosts") 110(1) through 110(N) access a data storage apparatus 116 over a network 114. The data storage apparatus 116 includes a storage processor, or "SP," 120 and a set of storage devices 180. The set of storage devices 180 include, for example, hard disk drives, electronic flash drives, solid state drives, and/or other types of storage devices. Although not shown in FIG. 1, the data storage apparatus 116 may include multiple SPs like the SP 120. For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing file system requests from hosts 110(1-N).

The network 114 can be any type of network or combination of networks, such as a storage area network (SAN), local area network (LAN), wide area network (WAN), the Internet, and/or some other type of network or combination of networks. The hosts 110(1-N) connect to the SP 120 using various technologies. For example, the hosts 110(1-N) can connect to the SP 120 using NFS (Network File System), SMB 3.0 (Server Message Block), and/or CIFS (Common Internet File System). Any number of hosts 110(1-N) may be provided, using any of the above protocols, some subset thereof, or other protocols besides those shown. As is known, NFS, SMB 3.0, and CIFS are file-based protocols. The SP 120 is configured to receive requests 112(1-N) according to these file-based protocols and to respond to such requests 112(1-N) by, for example, creating and deleting file systems, mounting and dismounting file systems, creating and deleting files and directories, and/or reading and writing files and directories, as maintained in the set of storage devices 180.

The SP 120 is seen to include one or more communication interfaces 122, a set of processing units 124, and memory 130. The communication interfaces 122 include, for example, network interface adapters, for converting electronic and/or optical signals received from the network 114 to electronic form for use by the SP 120. The set of processing units 124 includes one or more processing chips and/or assemblies. In a particular example, the set of processing units 124 includes multiple CPU cores. The memory 130 includes both volatile memory (e.g., RAM), and non-volatile memory, such as one or more ROMs, disk drives, solid state drives (SSDs), and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are made to carry out the operations of the software constructs. Although certain software constructs are specifically shown and described, it is understood that the memory 130 typically includes many other software constructs, which are not shown, such as an operating system, various applications, processes, and daemons.

As shown in FIG. 1, the memory 130 includes an IO stack 140, a file system controller 150, an auto-tiering manager 160, and a storage pool manager 170. The IO stack 140 operates in response to requests 112(1-N) to carry out file-based commands for reading and writing files, directories, and other constructs in the set of storage devices 180.

The file system controller 150 manages file systems stored in the set of storage devices 180 by performing various activities, such as creating new file systems, deleting file systems, establishing settings of file systems, and creating metadata for file systems. The file system controller 150 may operate on any number of file systems at once. For example, the SP 120 may provide access to hundreds or even thousands of different user file systems, as well as numerous internal file systems.

In accordance with the particular improvements hereof, the file system controller 150 also operates to partition the address spaces of file systems into multiple subspaces and to maintain an accounting of various features of each subspace on an individual basis. The different subspaces may include, for example, for any given file system:

- a data subspace having provisioned thereto a set of data storage elements on which host data of the file system are stored, but on which no inodes of the file system or MDBs (i.e., indirect blocks and directories) of the file system are stored;
- an inode subspace having provisioned thereto a set of inode storage elements on which inodes of the file system are stored, but on which no host data of the file system or MDBs of the file system are stored; and
- an MDB subspace having provisioned thereto a set of MDB storage elements on which indirect blocks and/or directory structures of the file system are stored, but on which no host data of the file system or inodes of the file system are stored.

Additional subspaces may be provided, such as a VBM subspace for storing VBMs (Virtual Block Maps), a shadow subspace for storing descriptors (e.g., CG headers and block metadata, or BMD) that pertain to the data subspace, and other subspaces for storing metadata yet to be determined. Generally, each subspace stores data or a particular type of metadata, such that data and different types of metadata are segregated among different subspaces.

The storage elements provisioned to the subspaces may be provided in various increments. In some examples, "storage elements" are provided as slices of uniform size that represent the smallest unit of storage that may be provisioned to the file system. Slices are derived from physical devices, e.g., from RAID groups of physical drives. In other examples, "storage elements" are other increments of storage that are provisioned to file systems, which may be uniform or non-uniform in size, and may be large or small. For instance, storage elements may have variable size derived from the physical or logical properties of the system in which they are used. Examples are provided below involving the provision of uniform slices to the various subspaces; however, it should be understood that other storage elements may be used in place of slices in any of these examples.

The auto-tiering manager 160 operates to select storage elements (e.g., slices) from particular storage devices to achieve a desired quality of service. For example, the auto-tiering manager 160 is configured to respond to requests to provision new storage for a particular subspace by selecting a slice derived from a group of devices of the set of storage devices 180 that meet a desired quality of service for that subspace. In an example, storage tiers are assigned based on access speed of storage media. Thus, flash and SSD storage are assigned to higher tiers, whereas rotating magnetic disc drives are assigned to lower tiers.

The auto-tiering manager 160 includes a policy 162, which associates particular tiers of storage with particular subspaces of a file system (or of file systems generally). For example, the policy 162 includes a list of the subspaces supported by file systems of the data storage apparatus 116. For each listed subspace, the policy 162 specifies a storage tier to be selected when provisioning new slices to file systems in the respective subspace. Thus, for example, the policy 162 may specify that flash storage (a higher tier) be provisioned for the inode subspace, but may specify that magnetic storage (a lower tier) be provisioned for the data subspace. In some cases, the policy 162 may specify multiple tiers of storage for each subspace. For example, the policy 162 may specify a first choice tier, a second choice tier, and so on, for each subspace, to allow for the possibility that slices from the first choice tier may not always be available for provisioning.

The storage pool manager 170 manages the provisioning of slices for use by file systems of the data storage apparatus 116. In the data storage apparatus 116, all slices are of a predetermined size (e.g., 256 MB) and each slice is associated with a particular storage tier, based on the performance of the underlying storage devices from which the slice is composed. In response to a request from a file system to provision a new storage slice to a particular subspace, the storage pool manager 170 accesses the policy 162 to identify a storage tier associated with the particular subspace. The storage pool manager then selects a slice of the specified storage tier and provisions the slice to the file system.

In operation, and by way of example, the data storage apparatus 116 receives a request (e.g., one of 112(1-N)) over the network 114 from a host (e.g., one of the hosts 110(1-N)) to store a new file in a user file system maintained on the data storage apparatus 116. The storage processor 120 receives the request via the communication interface(s) 122 and processes the request via the IO stack 140. The IO stack 140 communicates with the file system controller 150 to locate the user file system in the set of storage devices 180 and to check whether the user file system has enough free space in each of its subspaces to accommodate the new file. For example, the file system controller 150 checks whether the data subspace has enough room to store the new user data, whether the inode subspace has enough room to store a new inode for the new file, whether the MDB subspace has enough room to store new indirect blocks and directory structures to support the new file, and so on. If enough room is present in each subspace, the IO stack 140 acts in cooperation with the file system controller 150 to store the respective data and metadata in the respective subspaces.

If any subspace lacks sufficient room to accommodate the new data or metadata, however, the storage pool manager 170 may provision a new slice to the user file system in the particular subspace that requires the additional storage. For example, if the data subspace requires extra room to accommodate the new file, the storage pool manager 170 provisions a new slice of storage to the data subspace. The storage pool manager 170 performs this provisioning operation in cooperation with the auto-tiering manager 160, which accesses the policy 162 to identify a proper tier of storage to be used for the data subspace. The selection of the new slice is then made in accordance with the policy 162. Similarly, if the inode subspace requires extra room to accommodate the new file, the storage pool manager 170 provisions a new slice of storage to the inode subspace, again, with the slice being selected in accordance with the policy 162. Once each subspace has enough room to accommodate the new file, the IO stack 140 acts in cooperation with the file system controller 150 to store user data of the file in the data subspace, to store an inode of the file in the inode subspace, and to store MDB (indirect blocks and any directory entries) of the file in the MDB space. Other metadata may be stored in other subspaces, if the user file system supports such subspaces.

As described, storage slices are provisioned to subspaces of the file system on an as-needed basis, i.e., only when the subspaces are too small to accommodate the new data and/or metadata. This approach to provisioning is consistent with a thinly provisioned storage model.

As is known, thinly provisioned file systems typically have very large address spaces but allocate specific storage slices to populate the file systems only as storage is needed to satisfy write requests. A thinly provisioned file system may thus have an address space that is measured in petabytes but may allocate slices to occupy only a small fraction of the address space. By contrast, thickly provisioned file systems have particular fixed sizes and generally allocate slices to populate the entirety of those fixed sizes when the file systems are created. Although embodiments of the invention are directed to thinly provisioned file systems, the broad principles of the invention are not limited to thinly provisioned file systems and may be used with any types of file systems.

Figure 2:
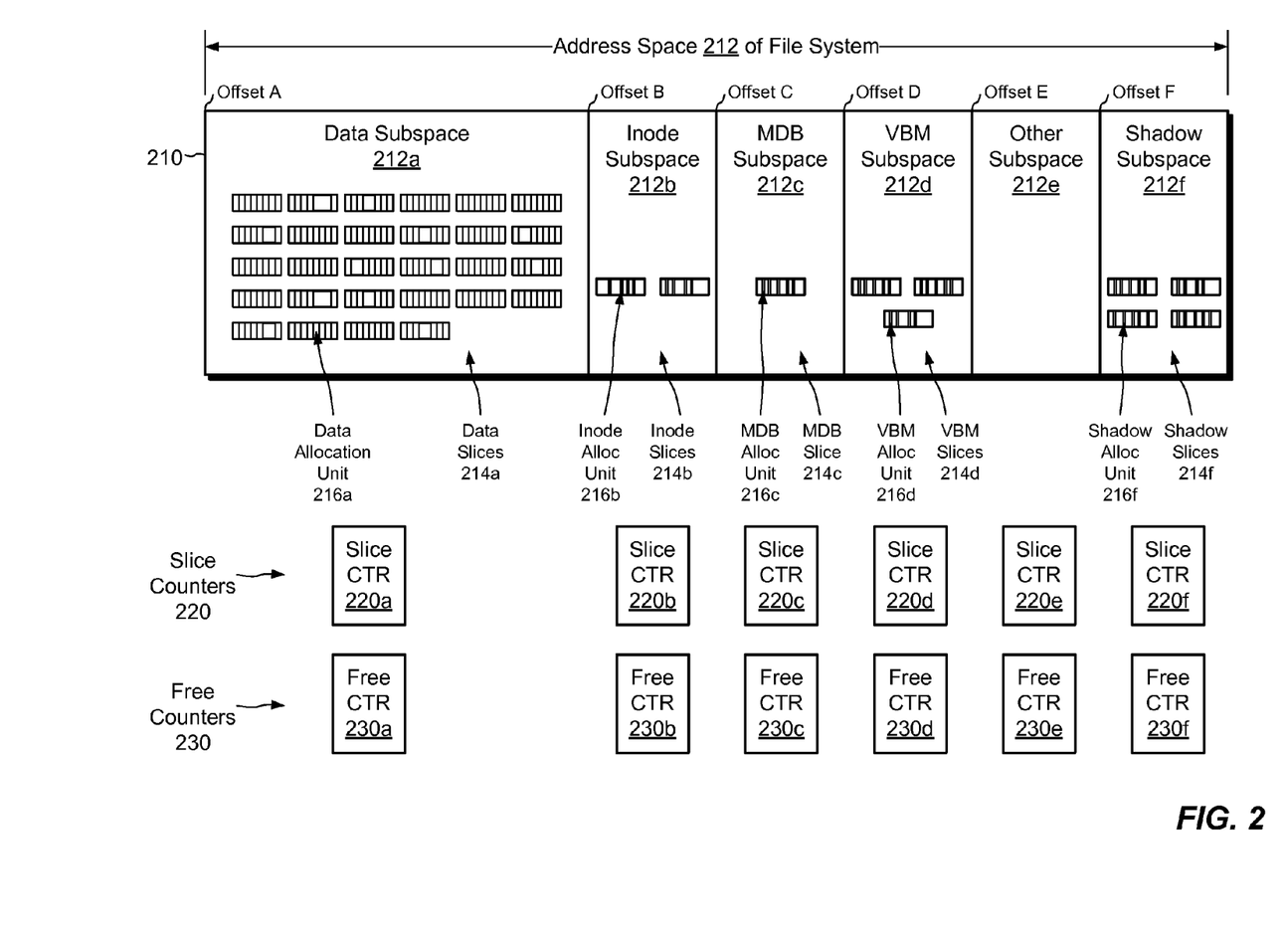
FIG. 2 is a block diagram showing an example file system having an address space divided into multiple subspaces.

FIG. 2 shows an example arrangement of a file system 210 which has been divided into subspaces in accordance with improvements hereof. Here, the file system 210 has an address space 212 (e.g., many petabytes), which has been divided into six subspaces: a data subspace 212*a*; an inode subspace 212*b*, an MDB subspace 212*c*, a VBM subspace 212*d*; an "other" subspace 212*e*, and a shadow subspace 212*f*. Although six subspaces are shown, embodiments may be constructed which contain a greater or fewer number of subspaces.

Each of the subspaces 212*a-f* has defined boundaries within the address space 212 of the file system 210. For example, the data subspace 212*a* starts at a defined location, Offset A, within the address space 212 and extends to a defined location, Offset B. In an example, the address range of the data subspace 212*a* between Offset A and Offset B is a contiguous range, which itself is very large and may be sparsely utilized. In a similar manner, the inode subspace 212*b* extends from Offset B to Offset C, the MDB subspace extends from Offset C to Offset D, and the VBM subspace extends from Offset D to Offset E. Also, the "other" subspace 212*e* extends from Offset E to Offset F and the shadow subspace 212*f* extends from Offset F to the end of the address space 212. In an example, the boundaries identified by Offset A through Offset F are established when the file system 210 is created. Different boundaries may be established for different file systems, based, for example, on the expected ratios of data to each type of metadata for which a subspace is provided. In an example, the particular subspaces to be included in the file system 210 are established when the file system 210 is created.

In an example, the data storage apparatus 116 provisions slices to each of the subspaces 212a-f. For example, the storage pool manager 170 provisions data slices 214a to the data subspace 212a, inode slices 214b to the inode subspace 212b, MDB slices 214c to the MDB subspace 212c, VBM slices 214d to the VBM subspace 212d, "other" slices 214e (if there are any) to the "other" subspace 212e, and shadow slices 214f to the shadow subspace 212f. The number of slices for each subspace may be provisioned on an as-needed basis (e.g., in a thinly provisioned model), all at once when the file system 210 is created (e.g., in a thickly provisioned model), or in some other manner. The slices provisioned to each subspace are selected for the respective subspace in accordance with the policy 162, such that the slices 214a-f in each of the subspaces 212a-f conform to the respective storage tiers as specified by the policy 162.

The different subspaces 212a-f effectively segregate data from certain types of metadata and also segregate different types of metadata from one another. For example, the data subspace 212a stores data, such as the contents of user files, but does not store inodes, indirect blocks, directory structures, VBMs, or "other" metadata. Similarly, the inode subspace 212b stores inodes but does not store user data, indirect blocks, directory structures, VBMs, or "other" metadata. Also, the MDB subspace 212c stores indirect blocks and directory structures, but does not store user data, inodes, VBMs, or "other" metadata. Similar exclusions apply to the "other" subspace 212e and to the shadow subspace 212f.

As is known, inodes are data structures in a file system that store, for each file, a particular number (an inode number) as well as file-specific attributes, such as ownership and file size. Also as is known, indirect blocks are blocks that are pointed to by inodes and which store pointers to any of (i) data blocks storing content of the file, (ii) VBMs storing pointers to data blocks storing content of the file, and (iii) other indirect blocks. VBMs themselves store pointers to data blocks storing file data (and are pointed to by such data blocks). As is known, data storage systems use VBMs primarily as metadata for enabling and simplifying de-duplication activities.

The "other" subspace 212e is intended to accommodate yet unspecified metadata and may initially be empty. The address space 212 may include any number of "other" subspaces like the subspace 212e. In a thinly provisioned model, such "other" subspaces may be provided essentially for free, as they occupy logical address sub-ranges in the address range 212, which may be established at a sufficiently large value that none of the subspaces 212a-f is ever expected to be filled to capacity.

The shadow subspace 212f includes shadow slices 214f. The shadow slices 214f store descriptors of data slices 214a in the data subspace 212a. As is known, slices are typically formatted to include metadata that describe the contents of the slices themselves, and which allow the slices to be essentially self-describing. Such descriptors typically include CG headers, i.e., bitmaps of free and allocated resources on a slice, and BMD (block metadata), which store additional information about the slice. In an example, the data slices 214a of the data subspace 212a are formatted such that they exclude the normally-provided descriptors. Rather than storing the descriptors of the data slices 214a in the data slices 214a themselves, the descriptors are instead stored in the shadow slices 214f of the shadow subspace 212f. Removing the descriptors from the data slices 214a promotes faster and more continuous reading and writing of data in the data subspace 212a, as there are no descriptors interspersed with the data that must be skipped over by reading and writing operations.

In an example, a shadow subspace 212f is provided only for data slices 214a in the data subspace 212a (i.e., not for the other subspaces 212b-e). Slices 214b-e of the other subspaces 212b-e each include the normally-provided descriptors. Thus, no provision is made to segregate the descriptors in the slices 214b-e from their respective metadata in the other subspaces. In other examples, however, such provision can be made, and the shadow subspace 212f (or additional shadow subspaces like 212f) can be provided to store descriptors of the inode subspace 212b, MDB subspace 212c, VBM subspace 212d, and/or "other" subspace 212e.

As further shown in FIG. 2, each of the subspaces 212a-f has its own "allocation unit." For example, the data subspace 212a has a data allocation unit 216a, the inode subspace 212b has an inode allocation unit 216b, the MDB subspace 212c has an MDB allocation unit 216c, the VBM subspace 212d has a VBM allocation unit 216d, the "other" subspace 212e has an "other" allocation unit 216e, and the shadow subspace 212f has a "shadow" allocation unit 216f. Each allocation unit is specific to a respective subspace and defines the minimum addressable amount of storage within the respective subspace. Allocation units are thus similar in concept to "blocks," but, unlike blocks, which are generally of a fixed size for all storage, allocation units can be established to be different sizes for the different subspaces 212a-f.

In an example, data allocation units 216a for the data subspace 212a are larger than allocation units 216b-f established for the other subspaces 212b-f. Providing larger allocation units 216a for the data subspace 212a allows larger amounts of data in the data subspace 212a to be described for any given amount of metadata, and thus promotes more efficient utilization of memory and cache. In a particular example, the allocation units 216b-f for metadata are made to be 8 KB (consistent with current "block" size), but the allocation unit 216a for data is made to be a power of 2 greater than 8 KB, such as 16 KB, 32 KB, and 128 KB, for example. The optimal size of the data allocation unit 216a may vary based on the sizes of files stored in the data subspace 216a. Larger data allocation units 216a are generally well suited for file systems containing mostly large files, whereas smaller data allocation units 216a are generally well suited for file systems containing mostly small files. In an example, allocation units 216a-f are established when the file system is created.

As still further shown in FIG. 2, counters 220 and 230 may be provided to store counts of slices and free resources. In an example, the counters 220 and 230 are part of the file system 210. A different pair of counters 220/230 is provided for each of the subspaces 212a-f. The counters 220a-f each store a dynamic count of slices that have been provisioned to the respective subspaces 212a-f. In the example shown, and to reflect the file system 210 as illustrated, the counter 220a may have a value of 28, reflecting a total of 28 slices in the data subspace 212a. Similarly, the counters 220b-f may have values of 2, 1, 3, 0, and 4, respectively.

By contrast, the counters 230a-f each store a dynamic count of free resources available in the respective subspaces 212a-f. The identities of the "resources" depend on the subspace. For example, the counter 230a stores a count of free data allocation units 216 in the data subspace 212a, whereas the counter 230b stores a count of free inodes in the inode subspace 212b. Similarly, the counter 230c stores a count of free MDBs, the counter 230d stores a count of free VBMs, the counter 230e stores a count of free "other" resources, and the counter 230f stores a count of free descriptors.

In a thinly provisioned model, the file system controller 150 monitors the counters 220 and 230. In an example, when the number of resources in any given subspace (as indicated by the counters 230a-f) falls below a predetermined threshold, the file system controller 150 directs the pool manager 170 to provision a new slice to the subspace. The file system controller 150 then increments the slice counter (one of 220a-f) to reflect the addition of a new slice and increases the count of free resources (in a respective one of the counters 230a-f) to reflect the number of additional free resources in the respective subspace made available as a result of adding the new slice. Conversely, the file system controller 150 may operate in communication with the pool manager 170 to remove slices from any of the subspaces 212a-f if the count of free resources, as reflected in any of the counters 230a-f, becomes so large that an entire slice may be removed from the subspace and reclaimed for use elsewhere in the data storage apparatus 116.

Figure 3:
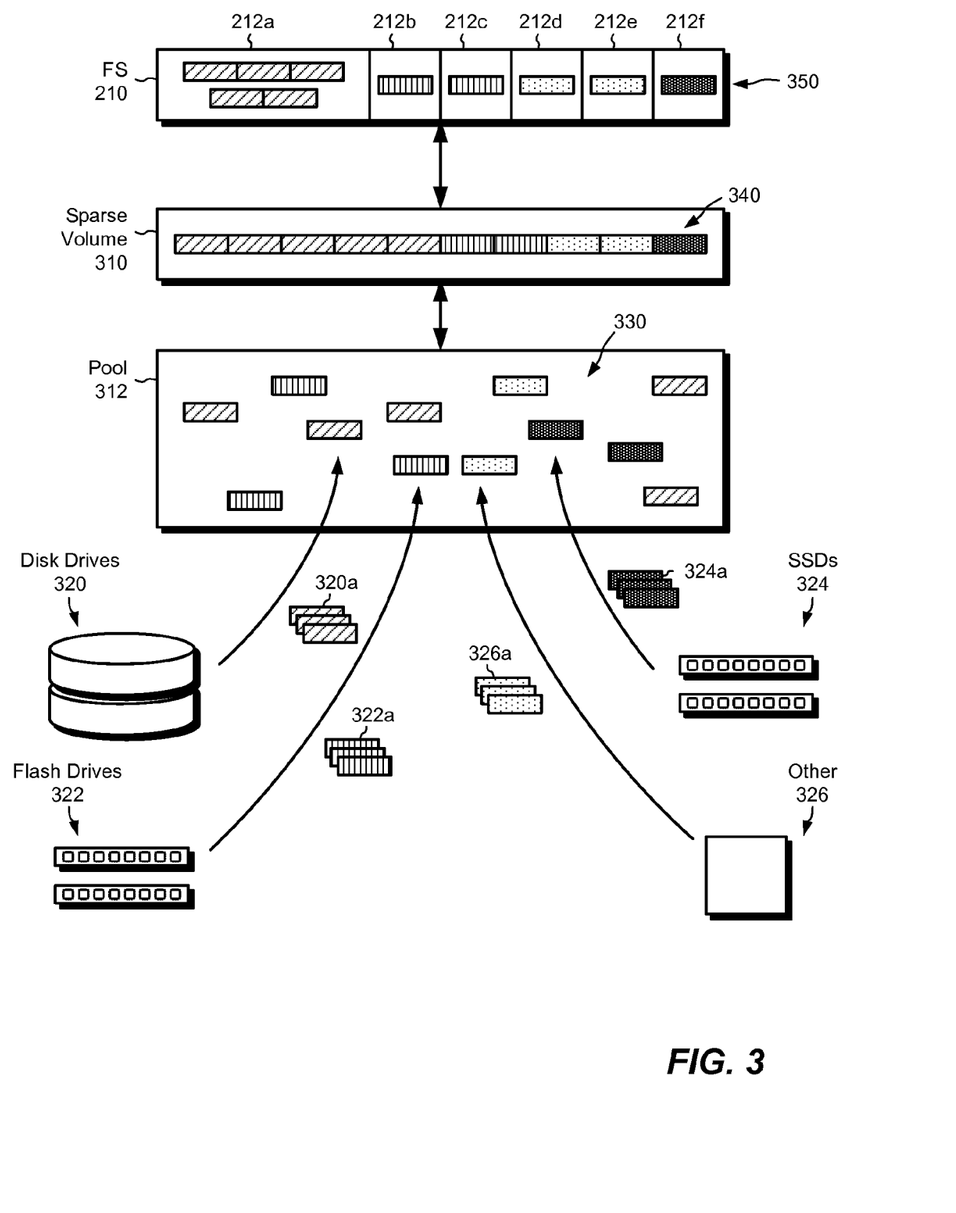
FIG. 3 is a block diagram showing an example stack-up of data storage constructs arranged to populate the file system of FIG. 2 with storage elements.

FIG. 3 shows an example arrangement of the file system 210 and structures within the data storage apparatus 116 that support the file system 210 in a thinly provisioned model. Here, the file system 210 is seen to include various slices 350, which have been provisioned to subspaces 212a-f of the file system 210. Different shading of the slices 350 indicates different storage tiers. The slices 350 may be served from slices 340 of a sparse volume 310. The sparse volume 310 obtains it slices from slices 330 of a pool 312. Slices 330 are obtained from the set of storage devices 180. Here, it is seen that storage devices of different types serve slices of different tiers to the pool 312. For example, disk drives 320 serve slices 320a, which belong to a lower tier of storage, flash drives 322 serve slices 322a, which belong to a higher tier of storage, SSDs 324 serve slices 324a, which belong to a still higher tier of storage, and "other" storage devices 326 serve slices 326a, which may belong to yet some other tier of storage.

The sparse volume 310 supports the file system 210. When a subspace of the file system 210 requires a new slice (e.g., when it is running low on free resources), the storage pool manager 170 requests a new slice. The storage pool manager 170 accesses the policy 162 and identifies the storage tier listed in the policy 162 for the subspace requesting the slice. The pool manager 170 then provisions a slice of the designated tier to the sparse volume 310 and then provisions the slice to the file system 210 in the subspace that requested the slice. A reverse process may be conducted for returning slices to the storage pool 312, when the slices are no longer needed.

Although FIG. 3 shows different slices in the file system 210, sparse volume 310, and pool 312, it should be understood that the slices shown at these levels are logical constructs and that the underlying storage exists only in the set of storage devices 180. For example, at least some of the slices 330 shown in the pool 312 represent the same underlying storage as the slices 340 shown in the sparse volume 310, and at least some of the slices 340 shown in the sparse volume 310 represent the same underlying storage as the slices 350 in the file system 210. Thus, for example, any particular slice in the file system 210 corresponds to one and only one slice in the sparse volume 310, which itself corresponds to one and only one slice in the pool 312. And that slice in the pool 312 is realized by a particular arrangement of storage devices (e.g., a portion of a stripe of a RAID group including multiple physical devices belonging to a particular storage tier).

Figure 4:
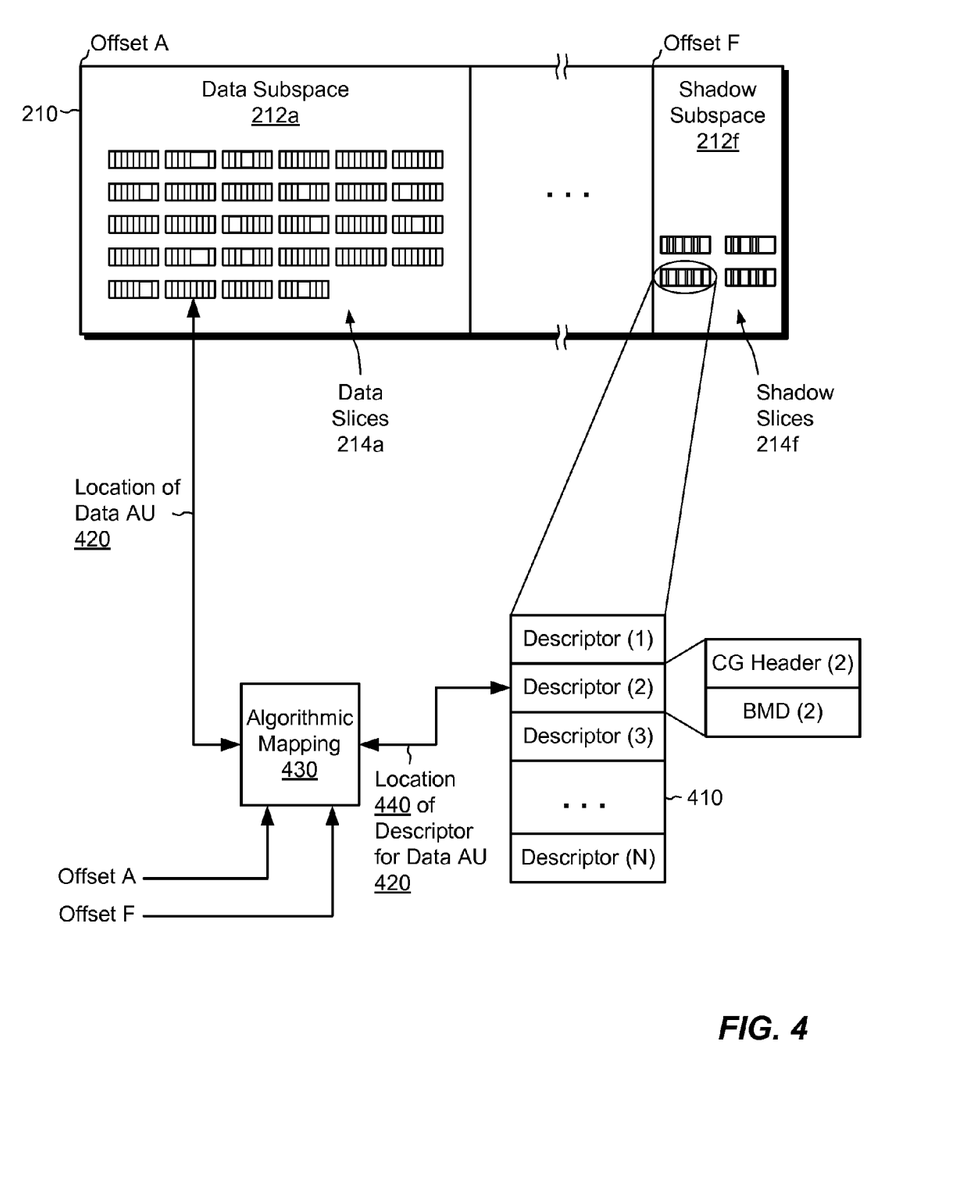
FIG. 4 is a block diagram showing another view of the example file system of FIG. 2, wherein algorithmic mapping is used to associate data in a data subspace of the file system with descriptors in a shadow subspace of the file system.

FIG. 4 shows example portions of the file system 210 in greater detail. Here, it is seen that data slices 214a of the data subspace 212a are mapped to particular shadow slices 214f of the shadow subspace 212f. As described in connection with FIG. 2, data slices 214a of the data subspace 212a are provided without descriptors (e.g., CG headers and BMDs), which are normally provided within slices to self-describe the allocation status and other aspects of the slices.

The data content of a particular shadow slice 410 is shown in expanded view. Here, each shadow allocation unit 216f stores a respective "descriptor." The shadow slice 410 is seen to include multiple descriptors (1-N). Each of the descriptors 1-N stores CG headers and BMD for a respective data slice of the data subspace 212a. Since the descriptors 1-N are typically small compared with the overall size of each of the data slices 214a, the shadow slice 410 (and generally, each shadow slice) includes descriptors for many different data slices 214a, e.g., "N" descriptors, which may range, for example, between about 30 and 50 (although this will vary based on implementation).

Data in the data subspace 212a may be mapped to descriptors in the shadow subspace 212f in any suitable way. In one example, an algorithmic mapping 430 is used, wherein a particular data allocation unit 216a at a location 420 in the data subspace 212a is mapped by operation of an algorithm (e.g., a formula) to a particular descriptor at a location 440 in the shadow subspace 212f. In addition to the location 420, the algorithmic mapping 430 may also take as input the offset within the address space 212 of the data subspace (Offset A) and the offset within the address space 212 of the shadow subspace 212f (Offset F). Receiving Offset A and Offset B allows the algorithmic mapping 430 to process locations 420 and 440 relative to the starting position of their respective subspaces, rather than based on absolute addresses within the address space 212.

In example operation, the file system 210 receives a request from a host (e.g., one of the requests 112(1-N)) to store new host data, such as to store a new file or to store more data in an existing file of the file system 210. In response to the request, the file system controller 150 stores the host data in one or more slices 214a of the data subspace 212a and creates one or more a new descriptors describing the contents of the new host data (e.g., new CG header values and new BMD). The file system controller 150 applies the algorithmic mapping 430 to identify one or more locations (e.g., 440) for storing the newly created descriptor(s) in the shadow subspace 214f based on the location(s) (e.g, 420) where the file system controller 150 stores the new host data in the data subspace 212a. The file system controller 150 writes the newly created descriptor(s) to the computed location(s) (e.g., 440) in the shadow subspace 212f.

A similar operation may be conducted when deleting host data from the data subspace 212a. For example, the file system controller 150 identifies the location of the host data to be deleted (e.g., 420). The algorithmic mapping 430 identifies the location(s) of one or more descriptors (e.g., 440) of the host data to be deleted in the shadow subspace 212f, and the file system controller 150 updates the descriptor(s) to indicate the that the data allocation units storing the data to be deleted are now free. It should be noted that both writing new host data and deleting host data and their associated descriptor(s) are generally accompanied by updates to the counters 220a/220f and/or 230a/230f.

Figure 5:
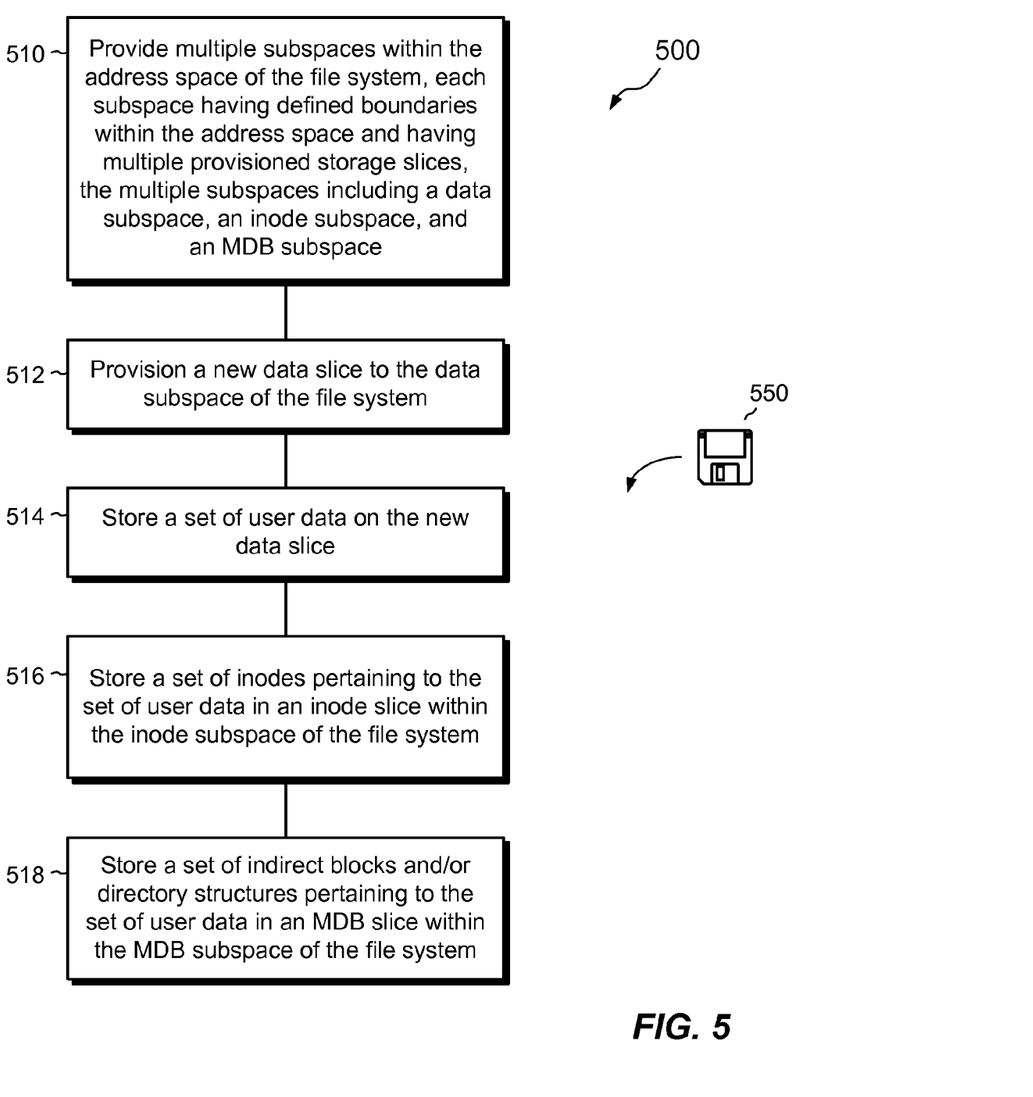
FIG. 5 is a flowchart showing an example process for managing the file system of FIG. 2.

FIG. 5 shows an example process 500 that may be carried out in connection with the environment 100. The process 500 is typically performed by the software constructs described in connection with FIGS. 1-4, which reside in the memory 130 of the storage processor 120 and are run by the set of processing units 124. The various acts of the process 500 may be ordered in any suitable way. Accordingly, embodiments may be constructed in which acts are performed in orders different from those illustrated, which may include performing some acts simultaneously, even though the acts are shown as sequential in the figure.

At step 510, multiple subspaces are provided within the address space of the file system, each subspace having defined boundaries within the address space and having a respective, distinct set of storage slices provisioned to it from one or more physical storage devices. The multiple subspaces include:
- a data subspace having provisioned thereto a set of storage slices on which host data of the file system are stored, but on which no inodes of the file system or MDBs (metadata blocks, including indirect blocks and directories) of the file system are stored;
- an inode subspace having provisioned thereto a set of inode storage slices on which inodes of the file system are stored, but on which no host data of the file system or MDBs of the file system are stored; and
- an MDB subspace having provisioned thereto a set of inode storage slices on which indirect blocks and/or directories of the file system are stored, but on which no host data of the file system or inodes of the file system are stored.

For example, the file system controller 150 divides the address space 212 of the file system 210 into multiple subspaces 212a-c (and in some examples also into additional subspaces 212d-f), thereby segregating data from certain metadata and segregating different types of data from one another.

At step 512, a new data slice is provisioned to the data subspace of the file system. For example, one of the slices 330 from the pool 312 is provisioned to the sparse volume 310 and to the data subspace 212a of the file system 210. Provisioning may take place, for example, in response to a request (one of 112(1-N)) from a host (one of 110(1-N)) to store a new file in the file system 210.

At step 514, a set of user data are stored on the new data slice. For example, the user data provided in the new file are stored in the newly provisioned data slice in the data subspace 212a.

At step 516, a set of inodes pertaining to files of the set of user data are stored in an inode slice within the inode subspace of the file system. For example, the file system controller 150 may store an inode describing the new file in a slice of the inode subspace 212b.

At step 518, a set of indirect blocks and/or directory structures pertaining to the set of user data are stored in an MDB slice within the MDB subspace of the file system. For example, the file system controller 150 stores a set of indirect blocks and directory structures in the MDB subspace 212c. The indirect blocks are pointed to by the inode for the file stored in step 516 and point to any of (i) data blocks of the file in the data subspace 212a, (ii) VBMs in the VBM subspace 212d, and/or (iii) other indirect blocks in the MDB subspace 212c. The directory structures include, for example, directory entries pertaining to the file, such as entries associating file names with inode numbers and other characteristics of the file.

It should be understood that steps 512-518 may be performed in any suitable order. Although step 514 will normally follow step 512 (provisioning before writing data), no other ordering among these steps is implied or required. Also, additional acts may be performed, depending on implementation. For example, if no space is available for new metadata in any of the metadata subspaces, a new slice (or other data element) may be provisioned to that subspace. Also, if the implementation involves the use of a shadow subspace, then descriptors of data slices may be added to shadow slices, as described above.

An improved technique for managing a file system includes dividing the addressable space of the file system (e.g., 210) into multiple subspaces: a data subspace (e.g., 212a) for user data; an inode subspace (e.g., 212b) for inodes describing the user data; and an MDB (metadata block) subspace (e.g., 212c) for indirect blocks and/or directory structures pertaining to the user data. In response to storage requests (e.g., requests 112(1-N)) to write user files to the file system 210, the file system stores user data of the files in the data subspace 212a, stores inodes pertaining to the user files in the inode subspace 212b, and stores indirect blocks and/or directory structures in the MDB subspace 212c. Segregation of data from certain metadata, and of different types of metadata from one another, promotes flexibility and provides a structural basis for many improvements in efficiency, such as automatic tiering of storage elements based on subspace, establishment of allocation units based on subspace, and segregation of descriptors for user data of the data subspace 212a in a separate shadow subspace 212f, which allows continuous reads and writes of data in the data subspace 212a without the need to skip over descriptors.

Having described certain embodiments, numerous alternative embodiments or variations can be made. For example, it has been shows and described that requests affecting the file system 210 arrive from hosts 110(1-N). This is merely an example, however. Alternatively, requests may be generated from other sources, including within the SP 120 itself. The file systems may be user file systems, internal file systems (e.g., managed and accessed internally to the SP 120), or other types of file systems.

In one particular example, the SP 120 manages a set of internal, "lower-deck" file systems, which store, as respective files of such file systems, user objects such as host file systems, LUNs, vVols, VMDKs, VHDs, and other structures. Host file systems, which may be referred to herein as "upper-deck" file systems, may thus be stored internally as files of one or more lower-deck file systems alongside other types of user objects. The techniques disclosed herein for managing file systems are applicable both for lower-deck file systems and for upper-deck file systems.

Also, although certain particular subspaces 212a-f are shown and described, such subspaces are provided as examples and are not intended to constitute a limiting list. Rather, the techniques disclosed may apply to any type of metadata, including existing metadata as well as metadata yet to be developed.

Also, although certain embodiments require the presence of a data subspace, an inode subspace, and an MDB subspace, other embodiments do not require all three of these subspaces. For example, other embodiments require only a data subspace and an inode subspace, only a data subspace and an MDB subspace, only a data subspace and a VBM subspace, only a data subspace and a shadow subspace, or some other combination of subspaces. The particular combinations of subspaces shown and described should thus be viewed merely as illustrative. Also, resources that are needed to implement a particular file system but are not provided in any dedicated subspace may be provided in some other subspace, which may not be specialized for any particular type of data or metadata.

Further, although features are shown and described with reference to particular embodiments or examples hereof, such features may be included in any of the disclosed embodiments and their variants. Thus, it is understood that features disclosed in connection with any embodiment or example can be included and hereby are included as variants of any other embodiment or example, whether such inclusion is made explicit herein or not.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 550 in FIG. 5). Multiple computer-readable media may be used. The medium (or media) may be encoded with instructions which, when executed on a set of processing units, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of managing a file system having an address space, comprising:
   providing multiple subspaces within the address space of the file system, each subspace having defined boundaries within the address space and having provisioned thereto a respective, distinct set of storage elements derived from one or more physical storage devices,
   the multiple subspaces including:
      a data subspace having provisioned thereto a set of data storage elements on which host data of the file system are stored, but on which no inodes of the file system or MDBs (metadata blocks, including indirect blocks and directories) of the file system are stored;
      an inode subspace having provisioned thereto a set of inode storage elements on which inodes of the file system are stored, but on which no host data of the file system or MDBs of the file system are stored; and
      an MDB subspace having provisioned thereto a set of MDB storage elements on which indirect blocks and/or directories of the file system are stored, but on which no host data of the file system or inodes of the file system are stored, and
   further comprising, for a set of user data:
      provisioning a new data storage element to the data subspace of the file system;
      storing the set of user data in the new data storage element;
      storing a set of inodes pertaining to the set of user data in an inode storage element within the inode subspace of the file system; and
      storing a set of indirect blocks and/or directory structures pertaining to the set of user data in an MDB storage element within the MDB subspace of the file system,
   wherein the file system is supported by a sparse volume, and wherein provisioning a new data storage element to the data subspace of the file system includes (i) provisioning the new data storage element to the sparse volume from a storage pool and (ii) provisioning the new data storage element to the data subspace of the file system from the sparse volume.

2. The method of claim 1, further comprising:
   establishing an allocation unit for each subspace of the file system, each allocation unit specifying a minimum addressable amount of storage in the respective subspace,
   wherein, upon establishing the allocation unit for each subspace, the allocation unit for the data subspace is made larger than the allocation unit for the inode subspace and the allocation unit for the data subspace is made larger than the allocation unit for the MDB subspace.

3. The method of claim 1, wherein the data subspace stores no metadata of the file system.

4. The method of claim 1, wherein providing multiple subspaces further includes providing a VBM (virtual block map) subspace having provisioned thereto a set of VBM storage elements on which VBMs of the file system are stored, but on which no user data of the file system, inodes of the file system, or MDBs of the file system are stored.

5. The method of claim 1, wherein providing multiple subspaces further includes providing at least one additional subspace for storing some other type of metadata not already stored in the other subspaces.

6. The method of claim 1, further comprising:
   receiving a request to provision a new storage element to a first subspace of the multiple subspaces of the file system;
   accessing a policy that specifies tiers of storage to be used for provisioning storage elements to different subspaces of the file system, each tier of storage providing a different quality of service;
   in response to the request to provision the new storage element and in accordance with the accessed policy, selecting the new storage element from a tier of storage that the policy specifies for the first subspace of the file system; and
   provisioning the selected storage element to the first subspace.

7. The method of claim 6, further comprising:
   receiving a request to provision a new storage element to a second subspace of the multiple subspaces of the file system;
   in response to the request to provision a new storage element to the second subspace and in accordance with the policy, selecting the new storage element for the second subspace from a tier of storage that the policy specifies for the second subspace of the file system; and
   provisioning the selected new storage element for the second subspace to the second subspace,
   wherein the new storage element provisioned to the second subspace provides a higher quality of service than the new storage element provisioned to the first subspace.

8. The method of claim 7, wherein the first subspace is the data subspace and the second subspace is the inode subspace.

9. The method of claim 4, wherein each of the provisioned storage elements of the inode subspace, the MDB subspace, and the VBM subspace includes multiple descriptors that describe the contents of the respective storage element.

10. The method of claim 9,
    wherein the data storage elements of the data subspace include no descriptors that describe the content of the respective storage elements, and wherein providing multiple subspaces within the address space of the file system further includes providing a shadow subspace, the shadow subspace including multiple shadow storage elements, each shadow storage element storing multiple descriptors describing the contents of at least one storage element of the data subspace.

11. The method of claim 10, wherein each shadow storage element in the shadow subspace stores multiple descriptors describing the contents of multiple data storage elements of the data subspace.

12. The method of claim 11, further comprising, in response to receiving a request to store new host data:
creating a new descriptor describing the contents of the new host data; and
storing the new descriptor in a shadow storage element of the shadow subspace at a location in the shadow subspace algorithmically determined based on a location of the new host data in the data subspace.

13. The method of claim 12, further comprising, in response to receiving a request to delete host data:
algorithmically determining a location of a descriptor of the host data to be deleted in the shadow subspace based on a location of the host data to be deleted in the data subspace; and
marking as deleted the host data to be deleted in the descriptor of the host data to be deleted in the shadow subspace.

14. The method of claim 13, wherein the multiple descriptors describing the contents of multiple data storage elements of the data subspace include CG headers and BMDs, wherein the CG headers include bitmaps of free and allocated resources in the data subspace, and wherein the BMDs include metadata describing the contents of data storage elements in the data subspace.

15. The method of claim 2, further comprising maintaining a count of free resources in each of the multiple subspaces.

16. The method of claim 15, further comprising requesting a new storage element for any of the subspaces in response to the number of free resources in that subspace falling below a predetermined minimum level.

17. The method of claim 15, wherein maintaining a count of free resources in each of the multiple subspaces includes:
maintaining a count of free inodes in the inode subspace;
maintaining a count of free data allocation units in the data subspace; and
maintaining a count of free MDB blocks in the MDB subspace.

18. A data storage apparatus, comprising:
a set of storage processors configured to receive requests from a set of host computing devices for reading and/or writing files; and
a set of storage devices, coupled to the set of storage processors and configured to store files accessible to the set of hosts via the set of storage processors,
wherein the set of storage processors includes a set of processing units coupled to memory, the memory storing executable instructions, which when executed by the set of processing units cause the set of processing units to perform a method of managing a file system, the method comprising:
providing multiple subspaces within an address space of the file system, each subspace having defined boundaries within the address space and having provisioned thereto a respective, distinct set of storage elements derived from one or more physical storage devices, the multiple subspaces including:
a data subspace having provisioned thereto a set of data storage elements on which host data of the file system are stored, but on which no inodes of the file system or MDBs (metadata blocks, including indirect blocks and directories) of the file system are stored;
an inode subspace having provisioned thereto a set of inode storage elements on which inodes of the file system are stored, but on which no host data of the file system or MDBs of the file system are stored; and
an MDB subspace having provisioned thereto a set of MDB storage elements on which indirect blocks and directories of the file system are stored, but on which no host data of the file system or inodes of the file system are stored, and
further comprising, for a set of user data:
provisioning a new data storage element to the data subspace of the file system;
storing the set of user data on the new data storage element;
storing a set of inodes pertaining to the set of user data in an inode storage element within the inode subspace of the file system; and
storing a set of indirect blocks and/or directory structures pertaining to the set of user data in an MDB storage element within the MDB subspace of the file system,
wherein the file system is supported by a sparse volume, and wherein provisioning a new data storage element to the data subspace of the file system includes (i) provisioning the new data storage element to the sparse volume from a storage pool and (ii) provisioning the new data storage element to the data subspace of the file system from the sparse volume.

19. The data storage apparatus of claim 18, wherein the method further comprises:
receiving a request to provision a new storage element to a first subspace of the multiple subspaces of the file system;
accessing a policy that specifies tiers of storage to be used for provisioning storage elements to different subspaces of the file system, each tier of storage providing a different quality of service;
in response to the request to provision the new storage element and in accordance with the accessed policy, selecting the new storage element from a tier of storage that the policy specifies for the first subspace of the file system;
provisioning the selected storage element to the first subspace;
receiving a request to provision a second new storage element of storage to a second subspace of the multiple subspaces of the file system;
in response to the request to provision the second new storage element of storage and in accordance with the policy, selecting the second new storage element from a tier of storage that the policy specifies for the second subspace of the file system; and
provisioning the selected second new storage element to the second subspace,
wherein the new storage element provisioned to the second subspace provides a higher quality of service than the new storage element provisioned to the first subspace.

20. A non-transitory computer-readable medium including instructions which, when executed by a set of processing units of a set of storage processors of a data storage system, cause the set of processing units to perform a method of managing a file system, the method comprising:
providing multiple subspaces within an address space of the file system, each subspace having defined boundaries within the address space and having provisioned thereto a respective, distinct set of storage elements derived from one or more physical storage devices, the multiple subspaces including:

a data subspace having provisioned thereto a set of data storage elements on which host data of the file system are stored, but on which no inodes of the file system or MDBs (metadata blocks, including indirect blocks and directories) of the file system are stored;

an inode subspace having provisioned thereto a set of inode storage elements on which inodes of the file system are stored, but on which no host data of the file system or MDBs of the file system are stored; and an MDB subspace having provisioned thereto a set of MDB storage elements on which indirect blocks and directories of the file system are stored, but on which no host data of the file system or inodes of the file system are stored, and further comprising, for a set of user data:

provisioning a new data storage element to the data subspace of the file system;

storing a set of user data on the new data storage element;

storing a set of inodes pertaining to the set of user data in an inode storage element within the inode subspace of the file system; and storing a set of indirect blocks and/or directory structures pertaining to the set of user data in an MDB storage element within the MDB subspace of the file system, wherein the file system is supported by a sparse volume, and wherein provisioning a new data storage element to the data subspace of the file system includes (i) provisioning the new data storage element to the sparse volume from a storage pool and (ii) provisioning the new data storage element to the data subspace of the file system from the sparse volume.

21. The method of claim 1, further comprising provisioning another new data storage element to the inode subspace of the file system, wherein provisioning the other new data storage element to the inode subspace of the file system includes (i) provisioning the other new data storage element to the sparse volume from the storage pool and (ii) provisioning the other new data storage element to the inode subspace of the file system from the sparse volume.

* * * * *